United States Patent [19]

Chen

[11] Patent Number: 5,703,946
[45] Date of Patent: Dec. 30, 1997

[54] MOBILE PHONE HOLDER

[76] Inventor: Yeh-ming Chen, 4th Fl., No. 153-2, Yenchi St., Taipei, Taiwan

[21] Appl. No.: 716,634

[22] Filed: Sep. 13, 1996

[51] Int. Cl.$^6$ .................................................. H04M 1/00
[52] U.S. Cl. ........................... 379/446; 379/454; 379/455
[58] Field of Search ................................. 379/446, 454, 379/455, 426, 428, 447, 449, 420; 455/89, 90

[56] References Cited

U.S. PATENT DOCUMENTS 5,388,155 2/1995 Smith ................................... 379/446

*Primary Examiner*—Jack Chiang
*Attorney, Agent, or Firm*—William E. Pelton

[57] ABSTRACT

A mobile phone holder includes a first plate and a second plate, each plate being "L" shaped and a slot is further provided respectively within the first plate and the second plate, a retaining member movably secured within the slots, a sound transmitting member provided on the second plate. The plates are combined such that vertical faces oppose each other with horizontal faces overlapping with aligned slots. The sound transmitting member has a sound resistent material securely attached on the second plate, a hollow connector securely connecting with the hole of the second plate, a conductor having a first end securely connected with the connector, and a second end securely connected with an ear plug. A mobile phone is able to be received with the holder as described previously, therefore, a user then easily receives a conversation through the ear plug and the conductor.

6 Claims, 6 Drawing Sheets

MOBILE PHONE HOLDER

FIELD OF THE INVENTION

The present invention generally relates to a holder, and more particularly to a mobile phone holder which uses two plates with an adjusting means connected therebetween to fit all sizes of mobile phones. Furthermore, a first end of a conductor is securely connected with one of the plates and a second end of the conductor is securely connected with an ear plug, such that a user is able to clearly hear whatever a caller says through the conductor.

BACKGROUND OF THE INVENTION

Mobile phones bring lots of convenience to users whenever and wherever a phone is needed. Yet, a mobile phone also brings much danger to users especially when they are driving along in busy traffic, because a user needs to use a hand to hold the mobile phone and subsequently only one hand remains to drive the car.

To prevent such accidents from happening, many types of mobile phone holders are introduced. Among them, a mobile phone holder is shown in FIG. 6. The mobile phone holder is designed to have a seat 60 having an ear set 61, a leg 62 integrally formed with the seat 60 and a clamp 63 movably mounted on the leg 62, a first electric wire 80 having an electric connector 81 securely connected with the wire 80 and a speaker 70 connected with the seat 60 through a second wire (not numbered).

FIG. 7 shows a mobile phone 90 is received within the seat 60, and the clamp 63 is adjacent to the speaking portion (not shown or numbered) of the holder and the ear set 61 is adjacent to the hearing portion (not numbered or shown) of the holder, such that a user is able to hear whatever a caller says from the speaker 70 through the ear set 61. Therefore, the user will no longer have to hold the mobile phone and driving a car simultaneously, which indeed reduces danger greatly while holding a phone in one hand.

Though, this kind of mobile phone holder is convenient and handy, it still suffers several disadvantages, such as:

1. Electro-magnetic wave interference:
   many electric devices, such as a radio, generate electro-magnetic waves which interferes with a mobile phone when the strength and the frequency is close or even the same with each other, such that a user will have trouble listening clearly to what a caller says from the other end of the phone.
2. Electricity consumption:
   A mobile phone holder of this kind uses electricity of a car, which increases the electricity consumption of the car. Consequently, the life span of a battery of the car will shorten dramatically if the load of the battery is too much.
3. Too much noise in the background:
   No matter whether a user of this kind of mobile phone holder is a caller or a receiver, whenever he/she talks through the speaker 70 to the other end of the phone, a receiver of this voice signal still has trouble listening clearly to what is sent through the speaker 70, because there is too much noise, such as the car engine sound, radio sound, etc., in the background to interfere with the transmission of the voice signal.

From the previous description, it is noted that especially when using a mobile phone holder in a car, a general holder will no longer meet the requirement.

Thus, a mobile phone holder constructed in accordance with the present invention tends to mitigate and/or obviate the aforementioned problems.

SUMMARY OF THE INVENTION

The main objective of the invention is to provide a mobile phone holder having an adjusting means mounted thereon such that the holder will be able to fit all sizes of mobile phones. Furthermore, the holder does not need any power to make conversation with the other end of the communication.

Another objective of the invention is to provide a mobile phone holder using a resilient connector instead of a wire to transmit a voice signal, thus the holder will have no trouble with interference.

Other objects, advantages and novel features of the invention will become more apparent from the following detailed description when taken in conjunction with the accompanying drawings.

BRIEF DESCRIPTION OF THE DRAWINGS

The present invention will now be better understood with reference of the accompanying drawings wherein.

DETAILED DESCRIPTION OF THE PREFERRED EMBODIMENT

Figure 1:
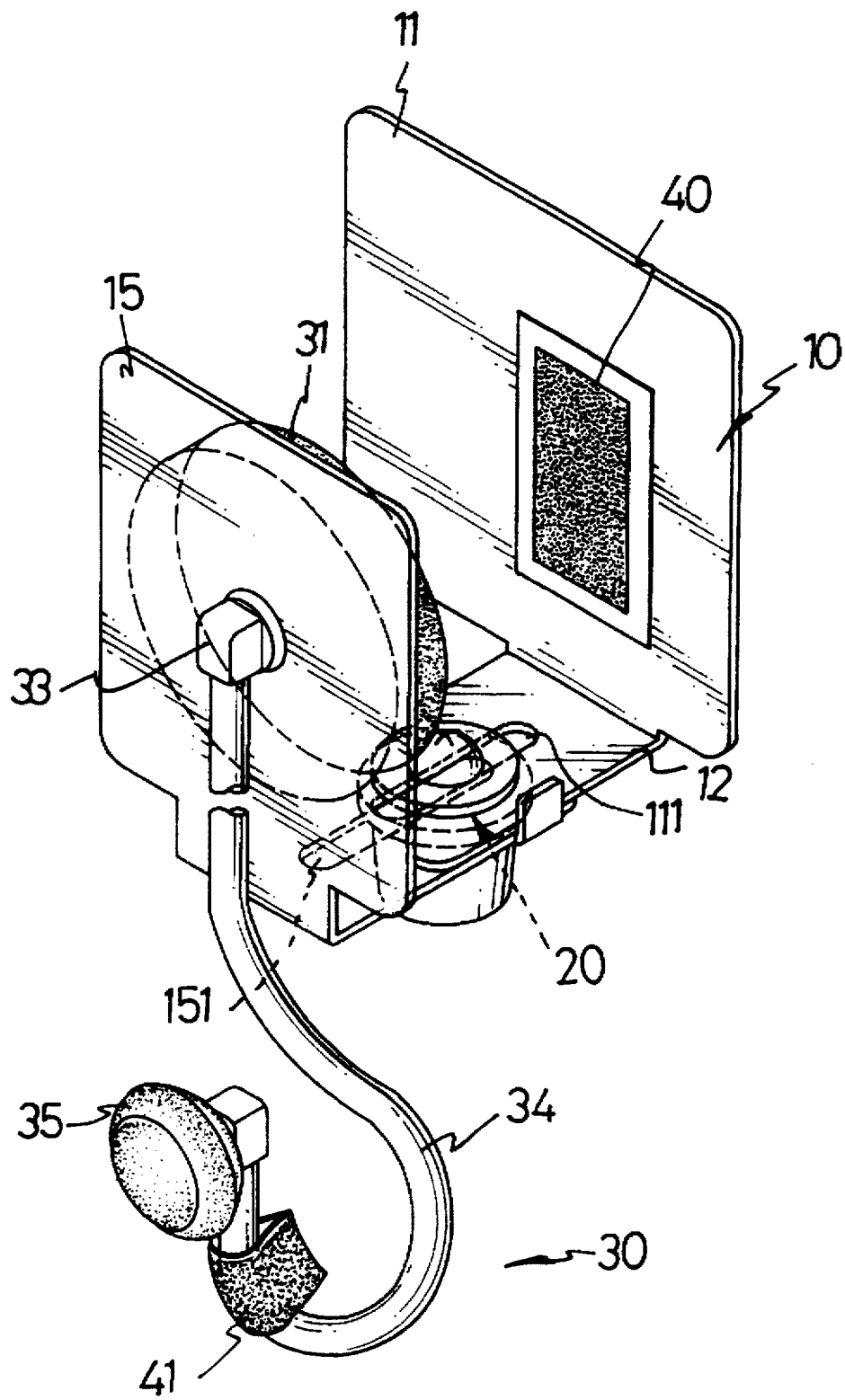
FIG. 1 is a perspective view of the invention.
Figure 2:
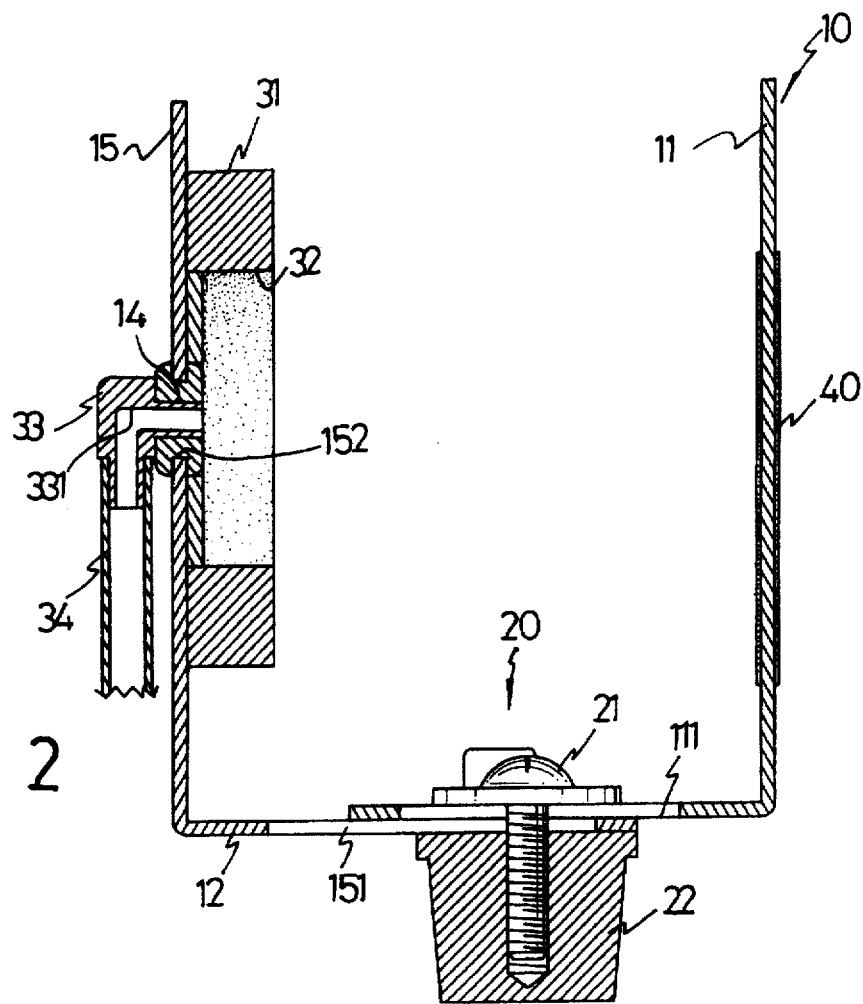
FIG. 2 a sectional view of the invention.

Referring to FIG. 1, a mobile phone holder constructed in accordance with the present invention comprises a clamping member 10 having a first plate 11 and a second plate 15. The first and second plates are each "L" shaped with a flat base and a perpendicular side extending upwardly therefrom. Each flat base defines a long slot (respectively 111 and 151) extending substantially along the length thereof. This first and second plates 11, 15 are combined so that the perpendicular sides are opposite to each other and one flat base is on top of the other, so that the long slots (111, 151) are aligned. The screw 21 (as shown in FIG. 2) preferably extends downward through the aligned slots 111, 151 to threadingly engage with the nut 22 (as shown in FIG. 2). Once an appropriate distance, i,e, a width of a mobile phone is reached between the "L" shaped first plate 11 and the second plate 15, the screw 21 and the nut 22 are tightened. A sound transmitting member 30 is mounted on the second plate 15 and having a sound resistent material 31 provided on an inner face of the second plate 15. A hollow connector 33 is securely extending through a hole (not shown) on the second plate 15. A conductor 34 has a first end and a second end wherein, the first end (not numbered) is securely connected with the connector 33 and the second end is securely connected with an ear plug 35. It is noted that a strip of adhesive slime 40 is securely provided on an inner face (not numbered) of the first plate 11 and a block of adhesive slime 41 is movably provided on the connector 34, so a user of the holder of the invention is able to use whether the strip of adhesive slime 40 or the block of adhesive slime 41 to stick to a face of a mobile phone (not shown) or any other place which is necessary.

Figure 3:
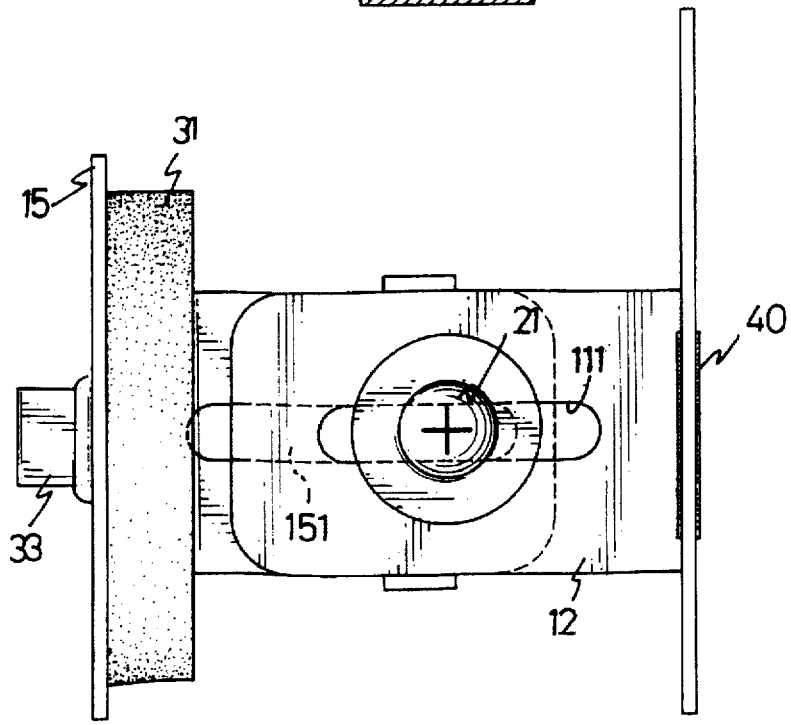
FIG. 3 is top view of the invention.

Referring to FIGS. 2 and 3, the retaining member 20 and the sound transmitting member 30 are shown. The retaining member 20 comprises a screw 21 and a nut 22. As described earlier, when an appropriate distance between the first plate 11 and the second plate 15 is completed, a user only has to firstly insert the screw 21 into the long slots 111 and 151 of the respective first plate 11 and the second plate 15, then secure the first plate 11 with the second plate 15 with the nut 22, thus a suitable distance between the first plate 11 and the second plate 15 is obtained for receiving a mobile phone. Although, the accompanying drawings show that the retaining member 20 comprises a screw 21 and a nut 22, it is appreciated that such drawings are illustrative only and not intended to limit the present invention.

The sound transmitting member 30 is composed of the sound resistent material 31 securely mounted on the inner face of the second plate 15, the hollow connector 33 securely connected with the second plate 15 and aligned with the hole 152 provided on the second plate 15, the conductor 34 fixedly connected with the hollow connector 33, therefore, an inner channel provided within the connector 33 is able to communicate with the conductor 34.

Figure 4:
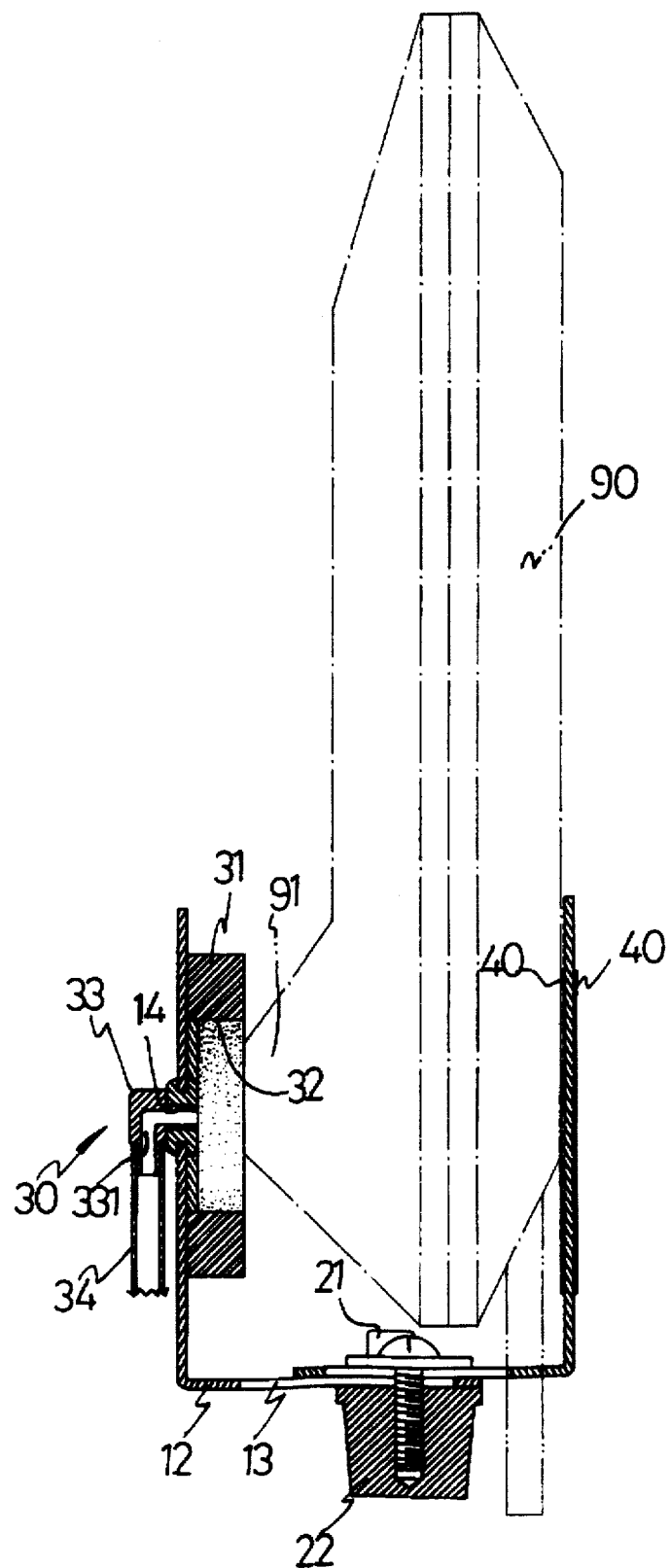
FIG. 4 is one embodiment of the invention with a mobile phone positioned within the holder.

FIG. 4 shows a mobile phone 90 is received within the holder of the present invention and a transmitting portion 91 of the mobile phone 90 is securely connected with the sound resistent material 31 and aligned with the hole 152 of the second plate 15, such that sound transmitted from the transmitting portion 91 of the mobile phone 90 is transmitted into the conductor 34 and the user is able to clearly hear it through the ear plug 35 (as shown in FIG. 1).

Figure 5:
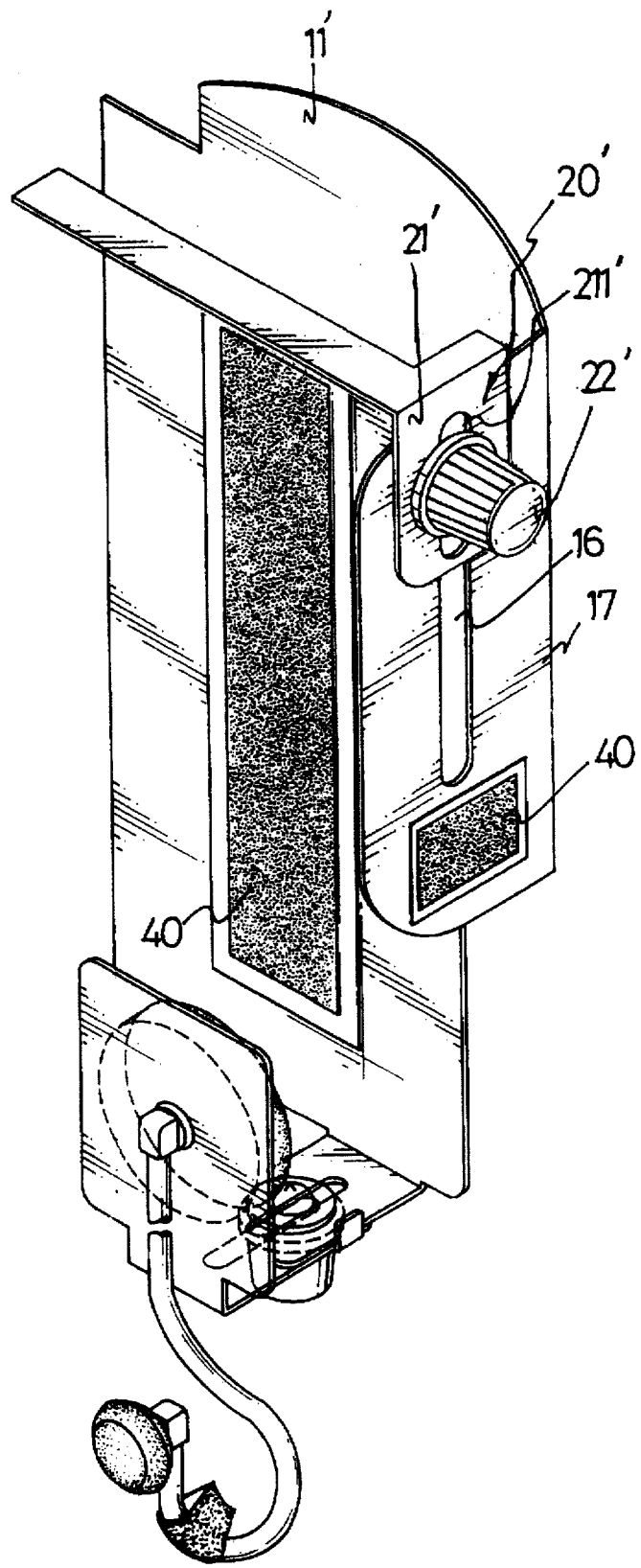
FIG. 5 is another embodiment of the invention showing that a holder constructed in accordance with FIG. 1 further comprises a third plate for adjusting the height of the holder.
Figure 6:
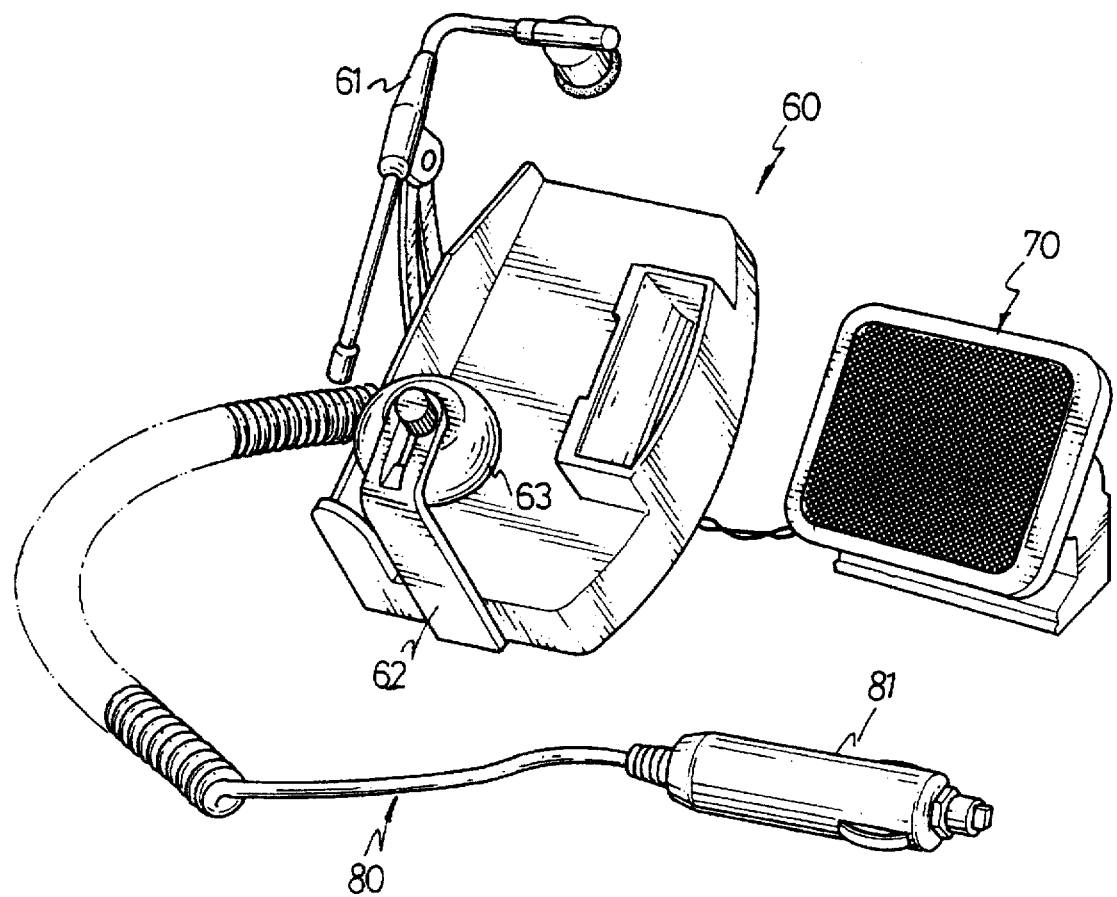
FIG. 6 is a perspective view of a prior mobile phone holder.
Figure 7:
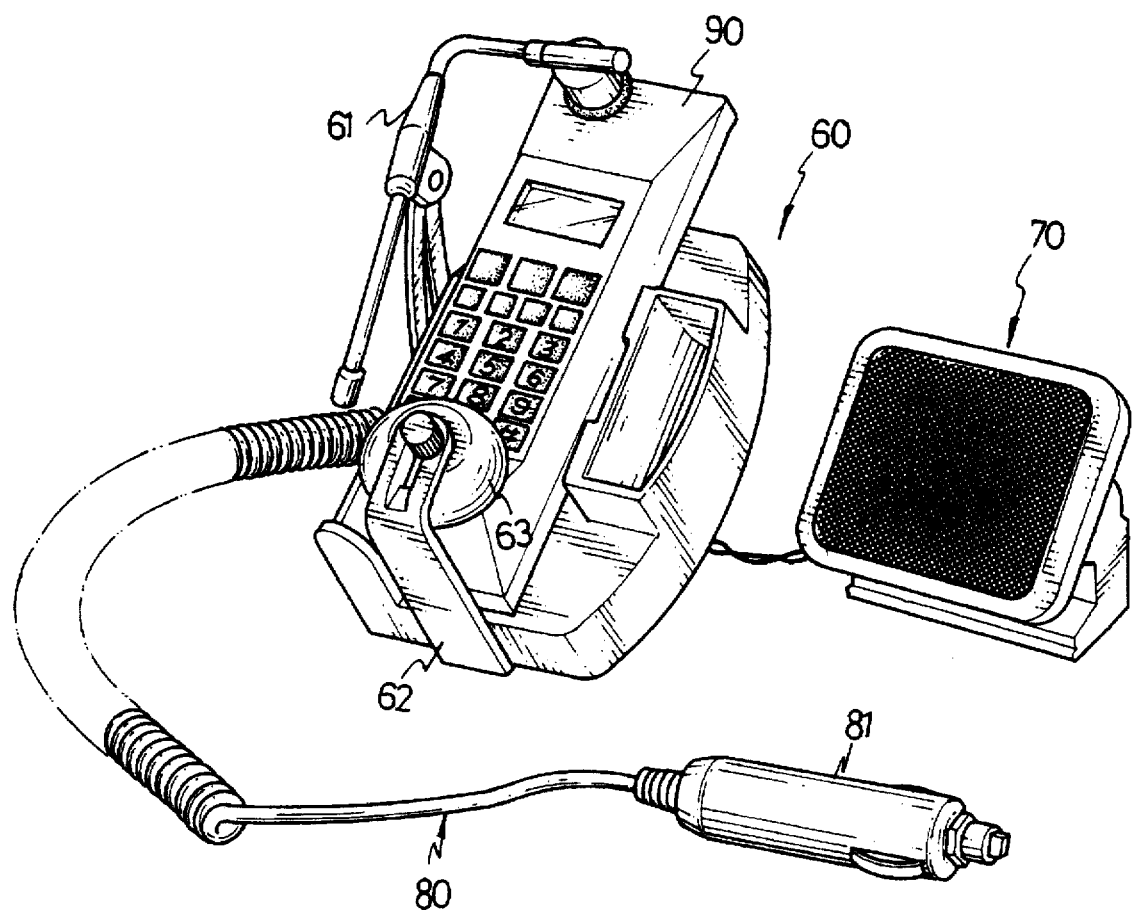
FIG. 7 is an embodiment of a prior art holder as shown in FIG. 6.

Referring to FIG. 5, another embodiment of the present invention is shown. The embodiment shows that a length of the first plate 11' is much larger than the first plate 11 of the first embodiment and further comprises a side plate 17 integrally and perpendicularly formed with the first plate 11', and having a second slot 16 provided therein. A substantially "L" shaped adjusting seat 20' has a third slot 211' provided in a plate 21' which is parallel to the side plate 17 but perpendicular to the first plate 11', thus, a height adjusting member (not numbered) is provided within the second slot 16 and the third slot 211' for securing the mobile phone (as shown in FIG. 4) when the second slot 16 of the side plate 17 coincides with the third slot 211' of the plate 21'.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A mobile phone holder comprising:

a clamping member having a first plate and a second plate which has a hole provided therein, each said plate being provided with a slot on each of a bottom portion thereof;

a retaining member movably secured within said slots of said first plate and said second plate;

a sound transmitting member mounted on said second plate and having a sound resistent material provided on said second plate;

a hollow connector securely extending through said hole of said second plate;

an ear plug; and a sound conductor having a first end which is securely connected with said hollow connector and a second end configured to be connected with said ear plug.

2. The holder as claimed in claim 1 further comprising an adhesive slime provided on said first plate.

3. The holder as claimed in claim 2 further comprising said slime provided on said sound conductor.

4. A mobile phone holder comprising:

a clamping member having a small first plate and a large second plate which has a hole provided therein, each said plate being provided with a slot on each of a bottom portion thereof;

a retaining member movably secured within said slots of said first plate and said second plate;

a sound transmitting member mounted on said small first plate and having a sound resistent material provided on said small first plate;

a hollow connector securely extending through said hole of said small first plate;

a sound conductor having a first end which is securely connected with the hollow connector and a second end which is securely connected with an ear plug;

a side plate integrally and perpendicularly formed with said large second plate and having a slot defined therein;

an adjusting seat having a slot provided in a plate which is parallel to said side plate but perpendicular to said first plate; and a retaining member movably secured within said slot of said side plate and said slot of said adjusting seat.

5. The holder as claimed in claim 4 further having a strip of adhesive slime provided on said first plate.

6. The holder as claimed in claim 5 further having said slime provided on said sound conductor.

* * * * *